March 17, 1942.   D. C. P. WILLIS   2,276,603
BUTT JOINTING DEVICE

Filed Oct. 14, 1939

INVENTOR
Daniel Charles Percy Willis
BY
ATTORNEYS

Patented Mar. 17, 1942

2,276,603

UNITED STATES PATENT OFFICE 2,276,603

BUTT-JOINTING DEVICE

Daniel Charles Percy Willis, Newcastle-on-Tyne, England, assignor to C. A. Parsons & Company, Limited, Newcastle-on-Tyne, England Application October 14, 1939, Serial No. 299,435
In Great Britain November 4, 1938

5 Claims. (Cl. 189—36)

This invention relates to butt-jointing devices suitable for withstanding high pressure steam, air, water or the like, and especially to such joints for use in high pressure steam turbine casings.

The common type of bolted horizontal joint for steam turbine casings has proved successful with ordinary pressures and temperatures provided great care is taken in the preparation of the joint faces.

On casings for high pressures and temperatures, however, great difficulty is found in making a tight turbine casing joint during water pressure tests in course of manufacture and under steam during commercial operation.

The best practical form of bolted joint employs a wide flange relieved over most of the width outside the bolts, but firmly butting at the extreme edges. This form entails somewhat wide flanges, however, which are open to serious objection on the grounds of cost, weight, thermal inertia and temperature stresses, and their use has been abandoned.

With a narrow flange it becomes increasingly important to get the bolts as close as possible to the centre line of the turbine casing section, but it is found that under load the bolts are powerless to prevent the flanges heeling about the outer edges and so opening somewhat inside the bolts.

With the object of minimising the defect very thick flanges have been adopted so as to enable the bolts to be brought as close as possible to the centre line. This does increase the effectiveness of a given bolt loading in maintaining the flanges in contact, but necessitates the use of very long bolts.

For high pressure the bolts assume very large proportions and must be pitched close together on account of the load, necessitating special forms of cap nuts. The nuts cannot be tightened up by the usual means, largely because the distance between them is too small to enable adequate spanners to be used, and other means are required, such as electric heating, to give the bolts the required initial stress.

The thick bolted flanges on horizontal joints of a turbine casing also cause distortion upon heating. When the casing halves are separated after service the distortion may be found to be so pronounced that the joint surfaces have to be refaced before a satisfactory re-union can be made. With the long bolts associated with thick flanges trouble is furthermore experienced from expansion under temperature and creep under load, allowing the joint face to distort and leak.

The main object of the present invention is to overcome the above difficulties. This is effected by exerting a powerful force on or nearly on the joint surfaces, at the same time reducing the mass of the joint flange by securing the two halves together with a tapered clamp making a continuous or substantially continuous intense grip along the joint edge, thus producing an efficient joint suitable for the highest pressures.

The invention also provides a simple and quick method of connecting and disconnecting the two joint members, this being effected by securing the tapered clamp by relatively small studs in each joint member, which are nevertheless adequate with the design of clamp employed.

The invention consists in butt-jointing devices as defined in the claims appended to this specification.

Referring to the accompanying diagrammatic drawing—

Figure 1:
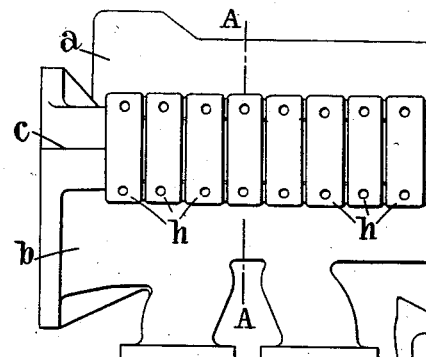
Figure 1 shows in side elevation the high pressure portion of a turbine casing embodying the present invention in one form.
Figure 2:
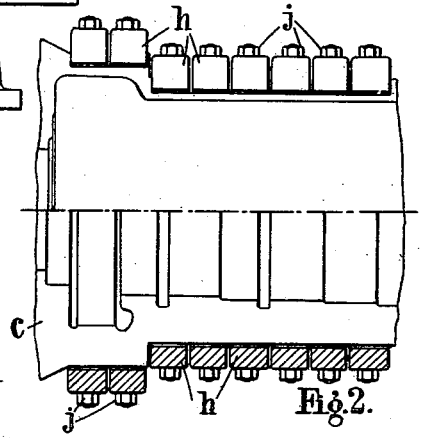
Figure 2 is partly a plan and partly a sectional plan thereof.
Figure 3:
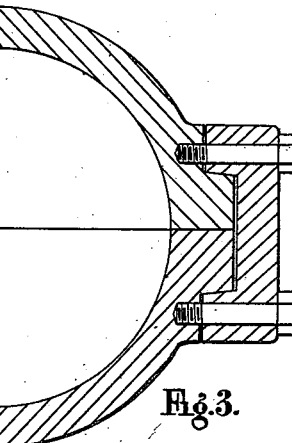
Figure 3 is an enlarged vertical sectional view on the line A—A of Figure 1.

In carrying the invention into effect according to one form illustrated by way of example in Figures 1, 2 and 3, as applied to the high pressure portion of the casing of a steam turbine, I provide a projection on each casing member $ab$ adjacent to the joint surface $c$. Adjacent projections $de$ are furnished with tapered surfaces $fg$ with which similarly tapered internal surfaces on a plurality of shallow U-shaped jaw members $h$ co-operate.

Studs $i$ are fixed to adjacent casing members $ab$ passing through holes in the jaw members $h$, thus enabling the jaws or clamps to be drawn towards the casing members by nuts $j$ applied to the outer threaded ends of the studs.

By this means the butting surfaces $c$ of the casing members are pressed together firmly by forces considerably greater than the tensile forces applied to the studs $i$; the effectiveness of given studs is thereby increased whilst their length may be kept short, and the use of wide flanges avoided.

Furthermore, the comparatively narrow flanges *de* entailed are not liable to distort the casing members under temperature, although maintaining fully the jointing pressure between the joint faces due to the wedge action of the clamps.

Again, no special tightening arrangements for the nuts on the studs are necessary, an ordinary hand-spanner being suitable. Turbines having casings clamped in accordance with the present invention may readily be assembled and dismantled owing to the facility with which the clamps may be fitted or removed.

The joint faces between the casing members may be relieved back until the contact surfaces are in line with the clamp jaw faces if desired.

Figure 4:
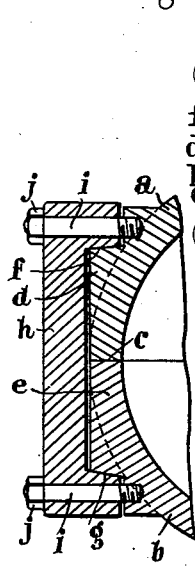
Figure 4 is a vertical sectional view of a modified arrangement.

Alternatively, as illustrated in Figure 4, the mutually engaging tapered surfaces *fg* may be disposed on a line passing through the centre of the whole of the butting surfaces *c* by widening the clamp members to an adequate extent, the tapered surfaces on the casing projections being disposed apart a correspondingly increased distance.

Instead of employing a plurality of clamps at each casing jointing region, a single clamp may be employed.

Figure 5:
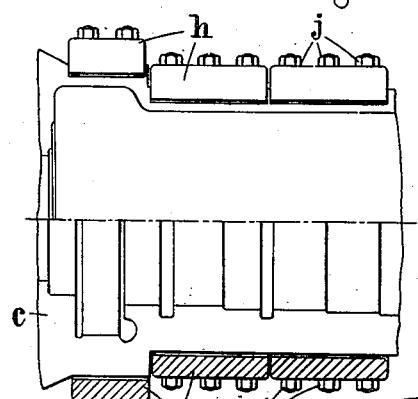
Figure 5 is a view similar to Figure 2 showing a modification.

Again, instead of providing a pair of studs only for each clamp, two or more pairs of studs may be employed for each clamp; in Figure 5 three pairs of studs are provided for each clamp.

Where a plurality of clamps is employed, they are preferably arranged close together with small clearance, e. g. as illustrated in Figures 1, 2 and 5, so as to give a substantially continuous jointing effect.

I claim:

1. A jointing device for butting surfaces of flanges comprising at least one rigid clamp member having tapered jaws for co-acting with similarly tapered surfaces on said flanges, said clamp members straddling said butting surfaces and screw tightening means disposed on opposite sides of said butting surfaces respectively and operating between clamp member and flange at each end of said clamp member to effect sliding of said tapered jaws over the co-acting tapered surfaces on said flanges.

2. A butt-jointing comprising a pair of flanges, a butting surface on each flange, a tapered surface on each flange, at least one clamp member straddling said butting surfaces, a tapered surface near each end of said clamp member co-acting with said first-mentioned tapered surfaces respectively and a tightening means at each end of said clamp member and respectively on opposite sides of said butting surfaces, said tightening means operating to move said clamp in a direction parallel to the plane containing said butting surfaces.

3. A butt-jointing as claimed in claim 2, wherein said co-acting tapered surfaces are in register with said butting surfaces.

4. A butt-jointing as claimed in claim 2, wherein said tightening means comprise studs secured to said flanges and provided with nuts.

5. A turbine casing formed in two parts, a flange on each part, a butting surface on each flange, a tapered surface on each flange, at least one clamp member straddling said butting surfaces, a tapered surface near each end of said clamp member co-acting with said first-mentioned tapered surfaces respectively and a tightening means at each end of said clamp member and on opposite sides of said butting surfaces, said tightening means operating between said clamp and said flanges to draw said clamp bodily towards said turbine casing.

DANIEL CHARLES PERCY WILLIS.